(12) United States Patent
Watanabe et al.

(10) Patent No.: US 8,038,554 B2
(45) Date of Patent: Oct. 18, 2011

(54) ISOLATION DAMPER PULLEY AND METHOD OF PRODUCING THE SAME

(75) Inventors: Hideaki Watanabe, Ageo (JP); Kazumi Oki, Ageo (JP); Yoshikazu Kakinuma, Ageo (JP)

(73) Assignee: Fukoku Co., Ltd., Ageo-shi, Saitama (JP)

( * ) Notice: Subject to any disclaimer, the term of this patent is extended or adjusted under 35 U.S.C. 154(b) by 1180 days.

(21) Appl. No.: 10/564,231

(22) PCT Filed: Jul. 9, 2004

(86) PCT No.: PCT/JP2004/010156
§ 371 (c)(1),
(2), (4) Date: Mar. 6, 2006

(87) PCT Pub. No.: WO2005/005865
PCT Pub. Date: Jan. 20, 2005

(65) Prior Publication Data
US 2006/0172832 A1 Aug. 3, 2006

(30) Foreign Application Priority Data

Jul. 11, 2003 (JP) .................................. 2003-293972

(51) Int. Cl.
*F16H 55/36* (2006.01)
*F16D 3/00* (2006.01)
(52) U.S. Cl. ......................................................... 474/94
(58) Field of Classification Search ...................... 474/94;
74/572.21, 574.4, 572.2; *F16F 15/124, 15/126*
See application file for complete search history.

(56) References Cited

U.S. PATENT DOCUMENTS

| 5,988,015 A * | 11/1999 | Riu .............................. 74/574.2 |
| 7,300,372 B2 * | 11/2007 | Riu .................................. 474/94 |
| 2006/0264282 A1 * | 11/2006 | Moriya et al. ................... 474/94 |

FOREIGN PATENT DOCUMENTS

| EP | 1382886 A1 * | 1/2004 |
| GB | 2 374 654 | 10/2002 |
| GB | 2 382 395 A | 5/2003 |
| JP | 1-116253 | 4/1989 |
| JP | 07-229538 | 8/1995 |
| JP | 08177874 A * | 7/1996 |

(Continued)

*Primary Examiner* — Michael Mansen
*Assistant Examiner* — Robert Reese
(74) *Attorney, Agent, or Firm* — McCormick, Paulding & Huber LLP

(57) ABSTRACT

An isolation damper pulley comprises a damper section 1 and an isolation pulley section 2 assembled thereto, wherein a first fitting portion 18 constituted from a cylindrical portion concentric with a center axis O of a through hole 13 is provided to a hub 10 of the damper unit 1. The isolation pulley section 2 has a supporting member 22 fixed to a pulley portion 21 via an annular elastic member 23, wherein a second fitting portion 27 concentric with the first fitting portion 18 is provided to the supporting member 22. A third fitting portion 32 concentric with the first fitting portion 18 is provided to a pressing member 31 applying a precompression to the annular elastic member 23 in cooperation with the supporting member 22. The second fitting portion 27 and the third fitting portion 32 are fitted to each other and these fitting portions are fitted to the first fitting portion 18, so that the isolation pulley section 2 is assembled to the damper section 1.

7 Claims, 5 Drawing Sheets

FOREIGN PATENT DOCUMENTS

| | | | |
|---|---|---|---|
| JP | 2001-159448 | | 6/2001 |
| JP | 2004108528 A | * | 4/2004 |
| JP | 2004-162768 | | 6/2004 |
| JP | 2005133917 A | * | 5/2005 |
| JP | 2005299909 A | * | 10/2005 |
| WO | WO 2004007992 A1 | * | 1/2004 |

* cited by examiner

ISOLATION DAMPER PULLEY AND METHOD OF PRODUCING THE SAME

CROSS REFERENCE TO RELATED APPLICATIONS

This application is entitled to the benefit of and incorporates by reference essential subject matter disclosed in International Patent Application No. PCT/JP2004/010156 filed on Jul. 9, 2004 and Japanese Patent Application No. 2003-293972 filed Jul. 11, 2003.

TECHNICAL FILED

The present invention relates to a technique for an isolation damper pulley, which is mounted on a crankshaft of an engine to transmit torque of the crankshaft to various auxiliary machines via an endless belt, and in particular to a technique for an isolation damper pulley, which cuts off a speed fluctuation of the crankshaft generated due to a torque fluctuation of the engine mainly during a low-speed revolution of the engine such as during an idling revolution of the engine and reduces a torsional vibration of the crankshaft.

BACKGROUND ART

As described in Japanese Patent Laid-open Publication No. 2001-159448, for example, an isolation damper pulley has a damper section attached to a crankshaft and an isolation pulley section assembled to the damper section. The damper section has a hub attached to the crankshaft and an annular mass body fixed to a cylindrical portion of the hub via an annular elastic member. The isolation pulley section includes: a pulley portion, which comprises a cylindrical portion having a pulley groove formed in its outer circumferential surface and a cover portion extending from one end of the cylindrical portion in a central direction thereof; and an annular elastic member whose one end is fixed to the cover portion, wherein the other end of the annular elastic member is fixed to the hub via a supporting member.

DISCLOSURE OF THE INVENTION

FIG. 5 is a sectional view showing a portion of an isolation damper pulley. The isolation damper pulley has a damper section 41 and an isolation pulley section 42. The damper section 41 comprises a hub 43 mounted on a crankshaft and an annular mass body 45 fixed to an outer circumference of the hub 43 via an annular elastic member 44, thereby having a function of reducing a torsional vibration of the crankshaft. The hub 43 is generally formed by performing press work to a steel plate, and comprises a disk portion 47, in which a through hole 46 for piercing a tip of the crankshaft is formed at a center, and a cylindrical portion 48 extending axially from a peripheral edge of the disk portion 47. The annular mass body 45 has a small-diameter portion 45a and a large-diameter portion 45b to be formed in an annular shape as a whole. The annular elastic member 44 made of vulcanized gum etc. is press-inserted between an inner circumferential surface of the annular mass body 45 and an outer circumferential surface of the cylindrical portion 48 of the hub 43.

Meanwhile, the isolation pulley section 42 comprises a pulley portion 51, a supporting member 52, and an annular elastic member 53 fixed therebetween, thereby having a function of cutting off a speed fluctuation of the crankshaft generated due to a torque fluctuation of the crankshaft mainly during a low-speed revolution of the engine such as during an idling revolution of the engine. The supporting member 52 is generally formed by performing the press work to a steel plate, has a through hole 54 for piecing a tip of the crankshaft at its center, and comprises a disk portion 55 extending radially from the through hole 54 and face joined to the disk portion 47 of the hub 43 and a supporting portion 56 extending further radially from the disk portion 55 via a step portion and fixed to one end surface of the annular elastic member 53.

The pulley portion 51 has a cylindrical portion 57 disposed coaxially with the small-diameter portion 45a of the annular mass body 45 and covering an outer circumferential surface of the small-diameter portion 45a, and a cover portion 58 covering an end surface of the small-diameter portion 45a of the annular mass body 45, thereby being formed in a cylindrical shape. A plurality of annular pulley grooves 59 on which an endless belt (not shown) for driving an auxiliary machine is spanned are formed axially in an outer circumferential surface of the cylindrical portion 57 per predetermined interval, and the annular elastic member 53 made of vulcanized gum etc. is fixed between an inner surface of the cover portion 58 and a supporting portion 56 of the supporting member 52. The annular elastic member 53 is deformed in a torsional manner between the supporting member 52 and the pulley portion 51, thereby absorbing the speed fluctuation of the crankshaft.

A pressing member 61 is provided so as to be attached to the isolation pulley portion 42. The pressing member 61 is generally formed by performing the press work to a steel plate, is formed into a substantially cylindrical shape as a whole, has a through hole 62 for piercing the tip of the crankshaft at its center, and comprises: a disk portion 63 extending radially from the through hole 62 and face-joined to the disk portion 55 of the supporting member 52; a cylindrical portion 64 extending axially from a peripheral edge of the disk portion 63; and a pressing portion 65 extending radially from an end of the cylindrical portion 64 and pre-compressing the annular elastic member 53.

A journal bearing 66 is attached between an outer circumferential surface of the small-diameter portion 45a of the annular mass body 45 and an inner circumferential surface of the cylindrical portion 57 of the pulley portion 51, and a thrust bearing 67 is attached between the cover portion 58 of the pulley portion 51 and the pressing portion 65 of the pressing member 61. Those bearings are all made of resins.

An assembling procedure of the damper section 41, the isolation pulley section 42, and the pressing member 61 in manufacturing such an isolation damper pulley will be described below. First, the disk portions 47, 55, and 63 are made to abut axially on one another while respective axial centers of the through holes 46, 54, and 62 are aligned with one another. Simultaneously therewith, a surface of the cover portion 58 is pressed axially by the pressing portion 65, whereby the annular elastic member 44 is pre-compressed. Next, spot welding is performed to a plurality of locations so that the disk portion 47, the disk portion 55, and the disk portion 63 are securely face-joined, whereby the damper section 41, the isolation pulley section 42, and the pressing member 61 are unified. Therefore, assembling of the isolation damper pulley is completed.

The isolation damper pulley is mounted on a tip of a crankshaft (not shown) from a side of the damper section 41, so that an end surface 47a of the disk portion 47 of the hub 43 serves as a reference surface for fitting an axial-directional position of the crankshaft and the end surface 47a abuts on a positioning portion such as a flange provided on the crankshaft and therefore the axial-directional positioning of the isolation damper pulley with respect to the crankshaft is achieved. The damper section 41 and the isolation pulley portion 42 are assembled to each other so that axial-directional length of between the end surface 47a and each pulley groove 59, for example, the axial-directional separation length L1 between the end surface 47a and a bottom of a central groove 59a falls within a predetermined tolerance. This is because the axial-directional positions of a pulley groove (not shown) of an auxiliary-machine-side pulley preliminarily positioned and attached and the pulley groove 59 of the isolation damper pulley mounted on the crankshaft are made to coincide with each other, whereby a force of an axial-directional (wide-directional) component is prevented from being applied to the auxiliary-machine driving endless belt spanned between the pulleys to a maximum extent and smooth torque transmission is allowed and a long life of the endless belt is attained.

In the isolation damper pulley described above, however, since the disk portion 47 of the damper portion 41, the disk portion 55 of the isolation pulley section 42, and the disk portion 63 of the pressing member are face-joined to one another to be unified, the above-mentioned separation length L1 is determined depending on the thickness T of the disk portion 47 and the disk portion 55, the length L2 of the cylindrical portion 64 of the pressing member 61, and the thickness of the thrust bearing 67.

Therefore, in order to keep the separation length L1 within a range of the predetermined tolerance, it is necessary to perform the process work to the thickness of the disk portion 47 and the disk portion 55 with high precision and also to the length L2 of the cylindrical portion 64 with high precision and further to the thickness of the thrust bearing 67 with high precision. Especially, when the hub 43, the supporting member 52, and the pressing member 61 are formed by using steel plates and performing the press work, there is the problem of requiring performing, with high accuracy, the process work to the thicknesses T of the disk portion 47 of the hub 43 and the disk portion 55 of the supporting member 52 and to the length L2 of the cylindrical portion 64 of the pressing member 61.

Meanwhile, when the above separation length L1 exceeds the predetermined tolerance after assembling the damper section 41 and the isolation pulley section 42, a correction must be made by cutting a side of the end surface 47a of the disk portion 47 and thinning the disk portion 47 so that the axial-directional separation length L1 between the cut end surface and the bottom of the central groove 59a falls within the range of the predetermined tolerance. Accordingly, a problem arises such that correcting work performed after assembling them becomes much complicated.

Further, since the damper section, the isolation pulley section, and the pressing member are assembled by welding, there is a room for improving complication of working due to the welding and a degree of freedom for selecting a material constituting each member.

An object of the present invention is to provide an isolation damper pulley capable of adjusting axially an assembling position of the pulley groove of the isolation pulley section with respect to the damper section.

Another object of the invention is to provide an isolation damper pulley capable of making the axial-directional length or dimension of the damper section and the pulley groove fall within a range of the predetermined tolerance without improving the precision of the thickness of the supporting member and the length of the cylindrical portion of the pressing member.

Still another object of the invention is to provide an isolation damper pulley capable of applying axially a predetermined pre-compression to the elastic member without improving the precision of a bending position of the supporting portion of the supporting member and of the length of the cylindrical portion of the pressing member.

Still another object of the invention is to provide an isolation damper pulley capable of eliminating complication of assembling work due to welding and improving a degree of freedom for selecting a material of each member without joining the damper section, the isolation pulley section, and the pressing member by welding.

An isolation damper pulley according to the present invention is attached to a crankshaft of an engine and comprises: a damper unit including a hub having a mounting hole to said crankshaft and an annular mass body attached to an outside cylindrical portion provided to said hub via a first elastic member; a pulley unit including a cylindrical portion, in an outer circumferential portion of which a pulley groove is formed and that is disposed outside said annular mass body, and a cover portion extending from one axial-directional end of said cylindrical portion in a central direction; a second elastic member whose one end is fixed to a side of said damper unit, whose other end is fixed to a side of said pulley unit, and to which a pre-compression is applied axially; and a pressing unit pressing axially said pulley unit and applying an axial-directional pre-compression to said second elastic member, wherein a fixing position of said pressing unit is capable of being adjusted axially.

An isolation damper pulley according to the present invention is attached to a crankshaft of an engine and comprises: a damper unit including a hub having a mounting hole to said crankshaft, a first fitting portion provided to said hub so as to be concentric with a center axis of said mounting hole, and an annular mass body attached to an outside cylindrical portion provided to said hub via a first elastic member; a pulley unit including a cylindrical portion, in an outer circumferential portion of which a pulley groove is formed and which is disposed outside said annular mass body, and a cover portion extending from one axial-directional end of said cylindrical portion in a central direction; a second elastic member whose one end is fixed to a side of said damper unit, whose other end is fixed to a side of said pulley unit, and to which a pre-compression is applied axially; and a pressing unit having a third fitting portion so as to be concentric with said center axis, pressing axially said pulley unit, and applying an axial-directional pre-compression to said second elastic member, wherein said third fitting portion is axially press-inserted into said first fitting portion so as to be fitted coaxially, and said first fitting portion has an adjustment margin capable of adjusting axially a fitting position of said third fitting portion.

An isolation damper pulley according to the present invention is attached to a crankshaft of an engine and comprises: a damper unit including a hub having a mounting hole to said crankshaft, a first fitting portion provided to said hub so as to be concentric with a center axis of said mounting hole, and an annular mass body attached to an outside cylindrical portion provided to said hub via a first elastic member; a pulley unit including a cylindrical portion, in outer circumferential portion of which a pulley groove is formed and which is disposed outside said annular mass body, and a cover portion extending from one axial-directional end of said cylindrical portion in a central direction and supporting one axial-directional end of a second elastic member; a supporting unit having a second fitting portion concentric with said center axis and supporting the other axial-directional end of said second elastic member; and a pressing unit having a third fitting portion concentric with said center axis and pressing axially said cover portion to apply axially a pre-compression to said second elastic member, wherein said second fitting portion and said third fitting portion are axially press-inserted into each other so as to be fitted coaxially, and an inner fitting portion of said second fitting portion and said third fitting portion is axially press-inserted into said first fitting portion so as to be fitted coaxially.

In the isolation damper pulley according to the present invention, said first fitting portion, said second fitting portion, and said third fitting portion are each formed in a cylindrical shape.

In the isolation damper pulley according to the present invention, an outer circumferential surface of said third fitting portion is fitted in an inner circumferential surface of said second fitting portion, and an inner circumferential surface of said third fitting portion is fitted in an outer circumferential surface of said first fitting portion.

An isolation damper pulley according to the present invention is attached to a crankshaft of an engine and comprises: a damper unit including a hub having a mounting hole to said crankshaft, a first fitting portion provided to said hub so as to be concentric with a center axis of said mounting hole, and an annular mass body attached to an outside cylindrical portion provided to said hub via a first elastic member; a pulley unit including a cylindrical portion, in an outer circumferential portion of which a pulley groove is formed and which is disposed outside said annular mass body, and a cover portion extending from one axial-directional end of said cylindrical portion in a central direction and supporting one axial-directional end of a second elastic member; a supporting unit having a second fitting portion concentric with said center axis and supporting the other axial-directional end of said second elastic member; and a pressing unit having a third fitting portion concentric with said center axis and pressing axially said cover portion to apply axially a pre-compression to said second elastic member, wherein said second fitting portion and said third fitting portion are press-inserted into said first fitting portion without being fitted to each other, thereby being fitted to said first fitting portion.

A manufacturing method for an isolation damper pulley according to the present invention, the isolation damper pulley being attached to a crankshaft of an engine, comprises the steps of: preparing a damper unit including a hub having a mounting hole to said crankshaft, a first fitting portion provided to said hub concentric with a center axis of said mounting hole, and an annular mass body attached to an outside cylindrical portion provided to said hub via a first elastic member; preparing an isolation pulley unit including a pulley portion, in an outer circumferential portion of which a pulley groove is formed and which is disposed outside said annular mass body, a cover portion extending from one axial-directional end of said pulley portion and supporting one axial-directional end of a second elastic member, and a supporting means provided with a second fitting portion concentric with said first fitting portion and supporting the other axial-directional end of said second elastic member; press-inserting axially a third fitting portion of a pressing means into said second fitting portion, the pressing means having a pressing portion opposed to said cover portion and said third fitting portion concentric with said center axis, and fitting coaxially said second fitting portion and said third fitting portion under a state of applying axially a predetermined pre-compression to said second elastic member by said supporting means and said pressing means; and press-inserting axially an inner one of said second fitting portion and said third fitting portion into said first fitting portion and fitting coaxially said inner one to said first fitting portion at a position where an axial-directional isolation length between an end surface of said damper unit and said pulley groove becomes a predetermined length.

A manufacturing method for an isolation damper pulley according to the present invention, the isolation damper pulley being attaching to a crankshaft of an engine, comprises the steps of: preparing a damper unit including a hub having a mounting hole to said crankshaft, a first fitting portion provided to said hub so as to be concentric with a center axis of said mounting hole, and an annular mass body attached to an outside cylindrical portion provided to said hub via a first elastic member; preparing an isolation pulley unit including a pulley portion, in an outer circumferential portion of which a pulley groove is formed and which is disposed outside said annular mass body, a cover portion extending from one axial-directional end of said pulley portion in a central direction and supporting one axial-directional end of a second elastic member, and a supporting means provided with a second fitting portion concentric with said first fitting portion and supporting the other axial-directional end of said second elastic member; press-inserting axially said second fitting portion into said first fitting portion and fitting coaxially said second fitting portion to said first fitting portion; and press-inserting axially, into said first fitting portion, a pressing means having a pressing portion opposed to said cover portion and a third fitting portion concentric with said center axis, applying axially a predetermined pre-compression to said second elastic member by said supporting means and said pressing means, and fitting coaxially said third fitting portion to said first fitting portion at a position where an axial-directional isolation length between an end surface of said damper unit and said pulley groove becomes a predetermined length.

In the above-described invention, since the damper section and the isolation pulley section are assembled by press-inserting axially the second fitting portion and the third fitting portion into each other and the inner one of the second fitting portion and the third fitting portion is axially press-inserted into and fitted in the first fitting portion, the assembling position of the isolation pulley section with respect to the damper section can be adjusted. Thereby, an axial-directional dimension between the end surface of the damper section and the pulley groove can be made to fall within the range of the predetermined tolerance, without improving the thickness of the supporting member and the press work accuracy of the pressing member.

Since the supporting member and the pressing member are fitted coaxially by press-inserting the second fitting portion of the supporting member and the third fitting portion of the pressing member mutually and fitting both portions coaxially, the axial-directional isolation length between the supporting member and the pressing member can be adjusted. Thereby, the predetermined pre-compression can be applied axially to the elastic member without improving the press work precision of the supporting member and the pressing member.

Since the damper section and the isolation pulley section are assembled by press-inserting axially the second fitting portion and the third fitting portion mutually and fitting them coaxially and by press-inserting axially the inner one of the second fitting portion and the third fitting portion into the first fitting portion and fitting them, the damper section and the isolation pulley section can be assembled without positioning radically the damper section and the isolation pulley section.

Since the damper section and the isolation pulley section are assembled by fitting them, they can be assembled without welding these members, so that complication of the assembling work caused due to welding can be eliminated and a degree of freedom for selecting materials for respective members can be enhanced.

BEST MODE FOR CARRYING OUT THE INVENTION

Figure 1:
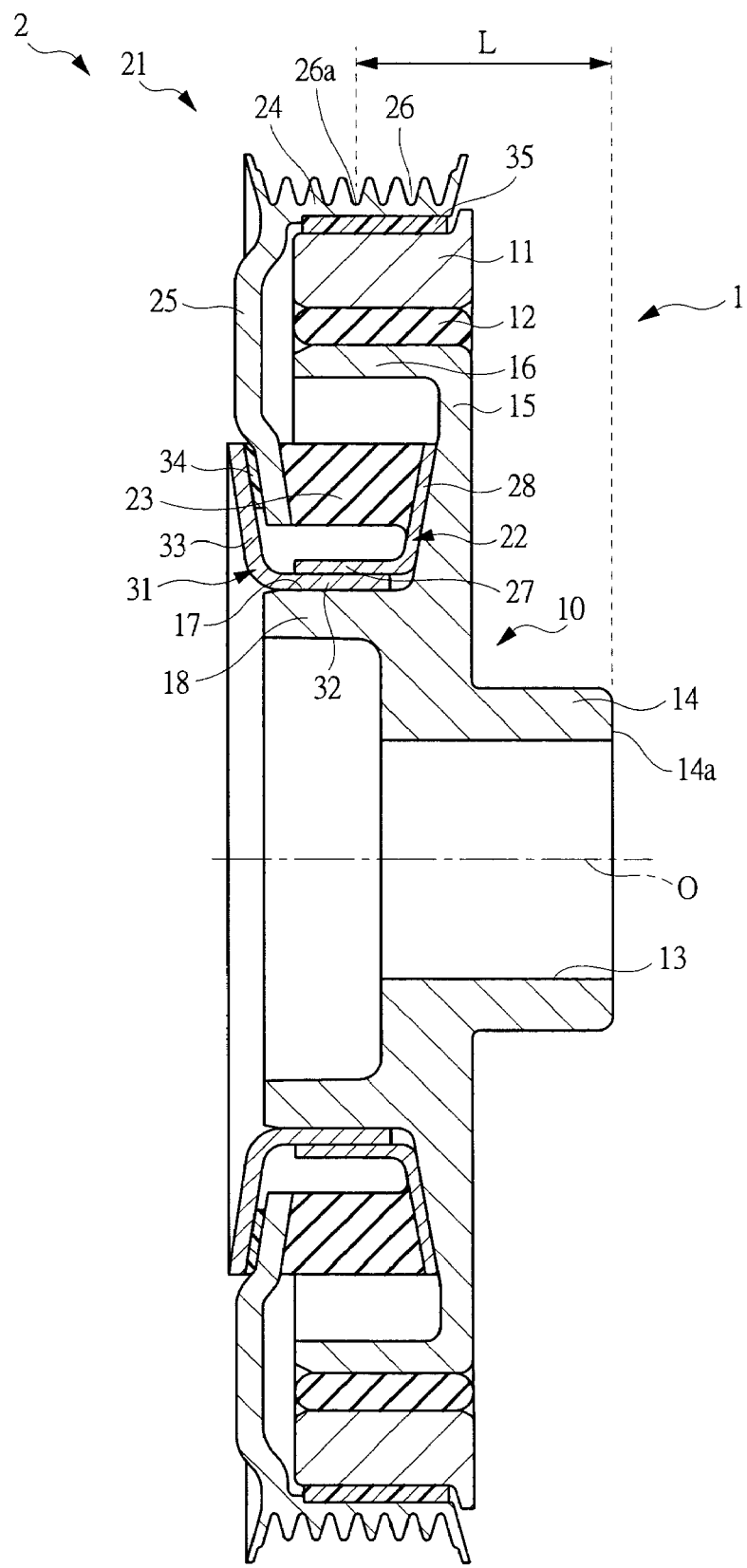
FIG. 1 is a sectional view showing an isolation damper pulley according to an embodiment of the present invention.

As shown in FIG. 1, an isolation damper pulley according to the present invention comprises a damper section 1 and an isolation pulley section 2, wherein the damper section 1 constitutes a damper unit and the isolation pulley section 2 constitutes a pulley unit. The damper section 1 includes a hub 10, an annular mass body 11, and an annular elastic member 12, thereby having a function of reducing a torsional vibration of a crankshaft.

The hub 10 includes: a boss portion 14 having a through hole 13 in which the crankshaft (not shown) is assembled; a disk portion 15 extending radially from the boss portion 14; and an outside cylindrical portion 16 extending axially from a peripheral edge of the disk portion 15 and having an outer circumferential surface 17 concentric with a center axis "O" of the boss portion 14, wherein an inside cylindrical portion 18 having an outer circumferential surface 17 concentric with the center axis O is provided to the disk portion 15 so as to extend axially from the disk portion 15 in parallel with the outside cylindrical portion 16 and to serve as a first fitting portion and an annular space is formed between the outside cylindrical portion 16 and the inside cylindrical portion 18. In the embodiment as illustrated in Figure, the hub 10 is formed by casting so that the respective portions constituting the hub are unified.

The annular mass body 11 is coaxially disposed outside the outside cylindrical portion 16 of the hub 10. The annular elastic member 12 is made of an elastic material such as vulcanized gum, and is press-inserted between an inner circumferential surface of the annular mass body 11 and an outer circumferential surface of the outside cylindrical portion 16.

Meanwhile, the isolation pulley section 2 includes a pulley portion 21, an isolation ring (supporting means) 22, and an annular elastic member 23 fixed therebetween, thereby having a function of cutting off a speed fluctuation of the crankshaft caused due to a torque fluctuation of an engine mainly during a low-speed revolution of the engine such as during a idling revolution of the engine.

The pulley portion 21 includes a cylindrical portion 24 covering an outer circumferential surface of the annular mass body 11, and a cover portion 25 covering an end surface of the annular mass body 11, thereby being formed into a cylindrical shape as a whole, wherein the cylindrical portion 24 is assembled to the damper section 1 so as to be concentric with the annular mass body 11. A plurality of annular pulley grooves 26, which an auxiliary-machine driving endless belt (not shown) spans, are formed axially in an outer circumferential surface of the cylindrical portion 24 per predetermined interval.

The isolation ring 22 includes a cylindrical fitting portion (second fitting portion) 27 disposed outside the inside cylindrical portion (first fitting portion) 18 so as to be concentric with the center axis O, and a supporting portion 28 extending radially from an end of the fitting portion 27, thereby being formed in a ring shape as a whole. The isolation ring 22 is formed by performing the press work to a steel plate in this embodiment.

The annular elastic member 23 is made of an elastic material such as vulcanized gum, its one axial-directional end is fixed to an inner surface of a radial-inner portion of the cover portion 25 of the pulley portion 21, and the other end thereof is fixed to an inner surface of the supporting portion 28 of the isolation ring 22. The annular elastic member 23 is deformed in a torsional manner between the pulley portion 21 and the isolation ring 22, thereby absorbing the speed fluctuation of the crankshaft.

Since the isolation pulley section 2 applies a compressing force to the annular elastic member 23 under a state of being attached to the damper section 1, a pressure ring 31 is disposed outside the inside cylindrical portion 18 so as to serve as a pressing means. The pressure ring 31 includes a cylindrical fitting portion (third fitting portion) 32 fitted to the fitting portion 27 so as to be concentric with the center axis O, and a pressing portion 33 extending radially from an end of the fitting portion 32, thereby being formed in a ring shape as a whole. The pressure ring 31 is formed by performing the press work to a steel plate.

The fitting portion 32 is press-inserted into the fitting portion 27 of the isolation ring 22 to be fitted coaxially, whereby an outer circumferential surface of the fitting portion 32 is face-joined to an inner circumferential surface of the fitting portion 27. The fitting portion 32 is press-inserted into the inside cylindrical portion 18 of the hub 10 so as to be fitted coaxially, whereby the inner circumferential surface of the fitting portion 32 is face-joined to the outer circumferential surface 17 of the inside cylindrical portion 18. By fitting the inside cylindrical portion 18, the fitting portion 27, and the fitting portion 32 to one another, the damper section 1 and the isolation pulley section 2 are assembled, so that the annular elastic member 23 becomes in an axially pre-compressed state. A thrust bearing 34 is disposed between the pressing portion 33 and the cover portion 25. The pressing member 33 presses the cover portion 25 of the pulley portion 21 via the thrust bearing 34, whereby a pre-expression is applied to the annular elastic member 23. A journal bearing 35 is provided between an outer circumferential surface of the annular mass body 11 and an inner circumferential surface of the cylindrical portion 24. The bearings 34, 35 are made of resins.

Since fitting positions of the fitting portion 27 of the isolation ring 22 and the fitting portion 32 of the pressure ring 31 as described above can be adjusted axially, the isolation length between the supporting portion 28 and the pressing portion 33 can be axially adjusted in assembling the isolation damper pulley. Thereby, when the pressure ring 31 is assembled to the isolation ring 22, the predetermined pre-compression can be applied axially to the annular elastic member 23. Since axial positions of the fitting portion 32 of the pressure ring 31 and the inside cylindrical portion 18 of the hub 10 can be also adjusted, an axial relative position of the damper section 1 and the isolation pulley section 2 can be adjusted in assembling the isolation damper pulley. For this reason, the axial-directional isolation length L between a mounting end surface 14a of the damper section 1 and an axial-directional-central pulley groove 26a can be adjusted. Accordingly, while the pre-compression applied to the annular elastic member 23 is maintained within an allowable range, the axial-directional position of the isolation pulley section 2 with respect to the damper section 1, namely, the isolation length L can be made to fall within the range of the predetermined tolerance, so that it becomes unnecessary to perform the press work to the pulley portion 21, the isolation ring 22, and the pressure ring 31 with high precision.

Figure 2:
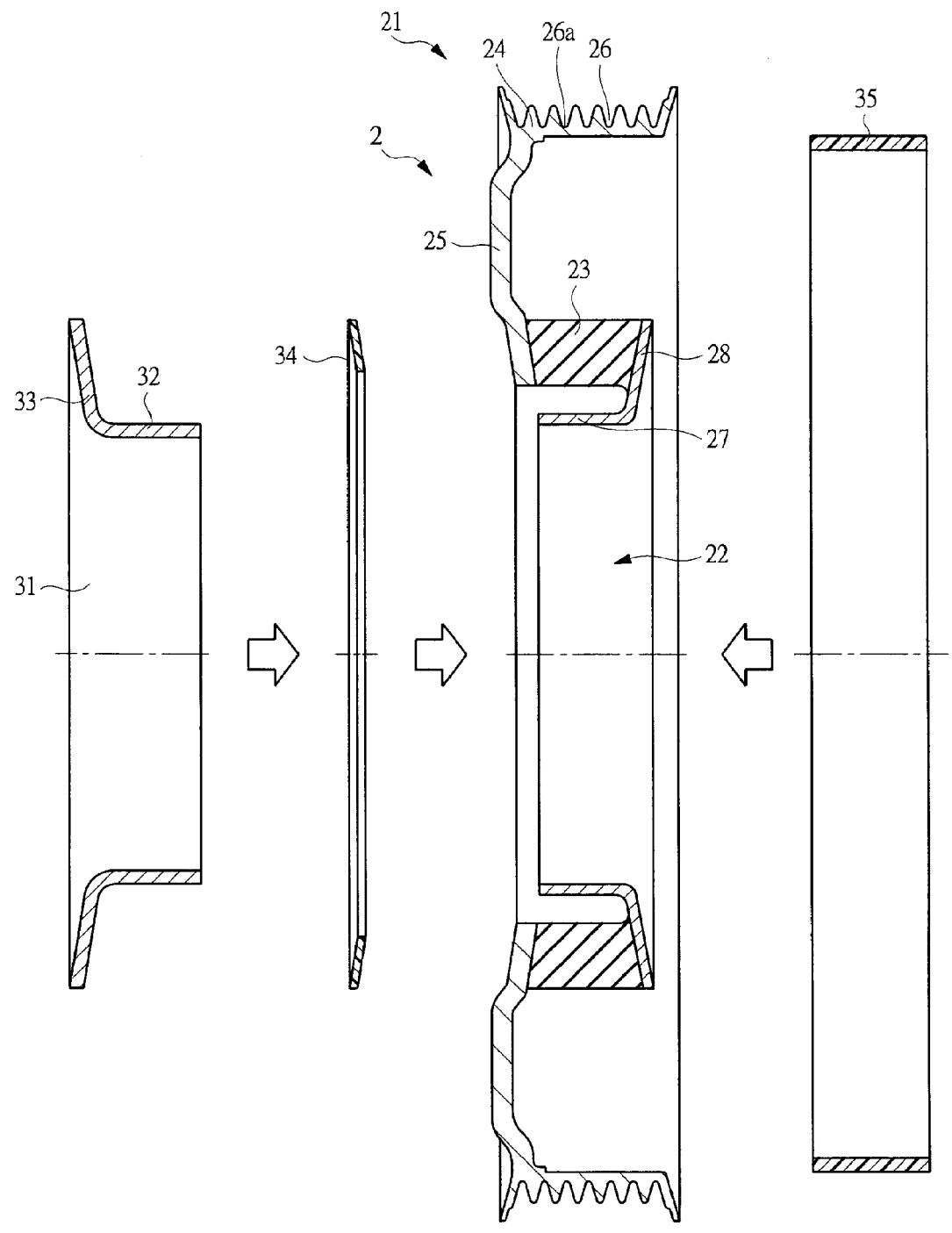
FIG. 2 is a sectional view showing an assembling step of an isolation pulley section shown in FIG. 1.

Next, one example of a manufacturing method for an isolation damper pulley according to the embodiment will be described with reference to FIGS. 2 and 3.

An assembling process of assembling the isolation pulley section 2 will be first described with reference to FIG. 2. The annular elastic member 23 is preliminarily attached between an inner surface of the cover portion 25 of the pulley portion 21 and an inner surface of the supporting portion 28 of the isolation ring 22 in a vulcanizing manner, and the pulley portion 21 is manufactured in a preparing step in advance, as shown in FIG. 2. Both of the fitting portions 27, 32 are fitted by press-inserting axially the fitting portion 32 of the pressure ring 31 into the fitting portion 27 of the isolation ring 22 under a state of interposing the thrust bearing 34 between the cover portion 25 of the pulley portion 21 and the pressing portion 33 of the pressure ring 31, whereby the pressure ring 31 is assembled to the isolation pulley section 2. Next, assembling the isolation pulley section 2 is completed by attaching the journal bearing 35 to the inner circumferential surface of the cylindrical portion 24 from an opening-side end of the pulley portion 21.

When both of the fitting portions 27, 32 are fitted, a positioning jig may be used to adjust the axial-directional length of the isolation pulley section 2 so that the isolation length of the isolation ring 22 and the pressure ring 31 (isolation length between the supporting portion 28 and the pressing portion 33) has a predetermined dimension.

Figure 3:
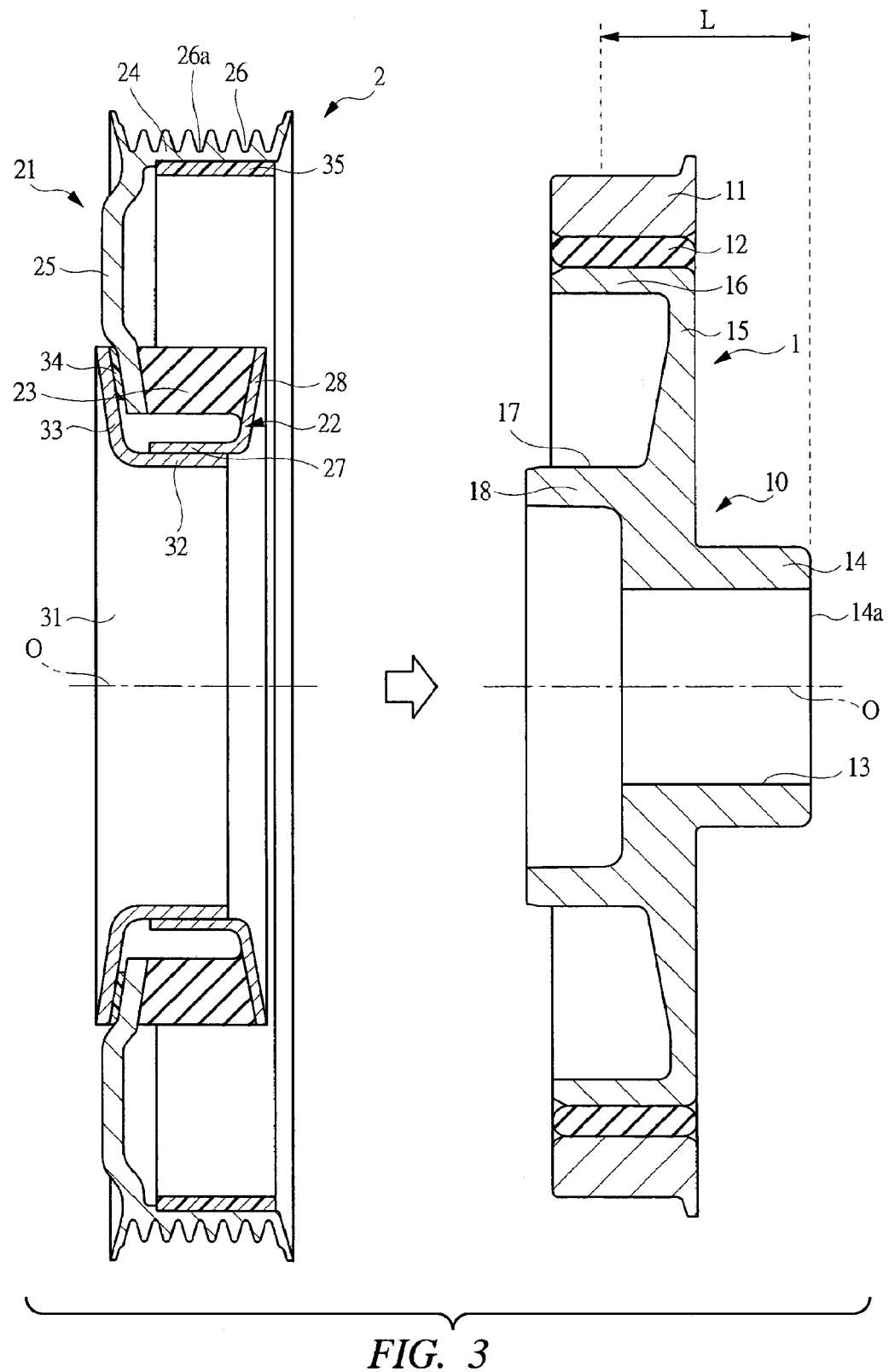
FIG. 3 is a sectional view showing an assembling step of a damper section and the isolation pulley section shown in FIG. 1.

As shown in FIG. 3, the damper section 1 is preliminarily manufactured in the preparation step by assembling the annular mass body 11 to the outer circumferential surface of the outside cylindrical portion 16 of the hub 10 via the annular elastic member 12.

Next, a step of assembling the damper section 1 and the isolation pulley section 2 will be described with reference to FIG. 3. The isolation pulley section 2 is slid to the damper section 1 temporarily fixed at a predetermined position using a hydraulic actuator (not shown), whereby the fitting portion 32 of the pressure ring 31 is axially press-inserted into the inside cylindrical portion 18 of the hub 10 due to a pressing force of the hydraulic actuator. Therefore, the inside cylindrical portion 18 and the fitting portion 32 are fitted, and the damper section 1 and the isolation pulley section 2 are assembled.

In assembling the damper section 1 and the isolation pulley section 2, a laser beam is irradiated at a position spaced axially from the end surface 14a by a length L, and the isolation pulley section 2 is axially pushed by the damper section 1. When an irradiation position of the laser beam coincides with the bottom of the central pulley groove 26a, the axial-directional isolation length between the mounting end surface 14a of the damper section 1 and the pulley groove can be certainly made to fall within a range of the predetermined tolerance by releasing the pressing force of the hydraulic actuator.

As described above, in the isolation damper pulley according to the embodiment, the fitting portion 32 of the pressure ring 31 is press-inserted axially into the fitting portion 27 of the isolation ring 22 to fit both fitting portions. Thereafter, if the fitting portion 32 of the pressure ring 31 is press-inserted axially into the inside cylindrical portion 18 to fit both, an assembling position of the pulley groove 26 of the isolation pulley section 2 with respect to the damper section 1 can be adjusted axially. Therefore, the axial-directional isolation length L1 between the end surface 14a of the damper section 1 and the bottom of the pulley groove 26 can be made to fall within the range of the predetermined tolerance, without requiring high precision of the thickness of the isolation ring and of the press work of the pressure ring 31. Further, welding for assembling work is made unnecessary, so that complication of the assembling work caused due to the welding is eliminated and concurrently a degree of freedom for selecting materials for respective members is enhanced.

Since the fitting portion of the pressure ring is press-inserted axially into the fitting portion of the isolation ring to fit both fitting portions, the isolation length between the isolation ring and the pressure ring can be axially adjusted in assembling them and the predetermined pre-compressed is applied axially to the annular elastic member 23 without requiring high precision of the press work of the isolation ring and the pressure ring 31.

The inside cylindrical portion 18 of the damper section 1 is provided so as to be concentric with the center axis O, so that since the fitting portion 32 of the pressure ring 31 of the isolation pulley section 2 is fitted in the inside cylindrical portion 18, radially positioning the damper section 1 and the isolation pulley section 2 becomes unnecessary and both can be easily assembled.

In the above-described embodiment, the tip of the fitting portion 32 of the pressure ring 31 is directed toward the hub 10 and the tip of the fitting portion 27 of the isolation ring 22 is directed toward the pressure ring 31, but the tip of the fitting portion 32 and the tip of the fitting portion 27 may be both directed toward the hub 10.

Figure 4:
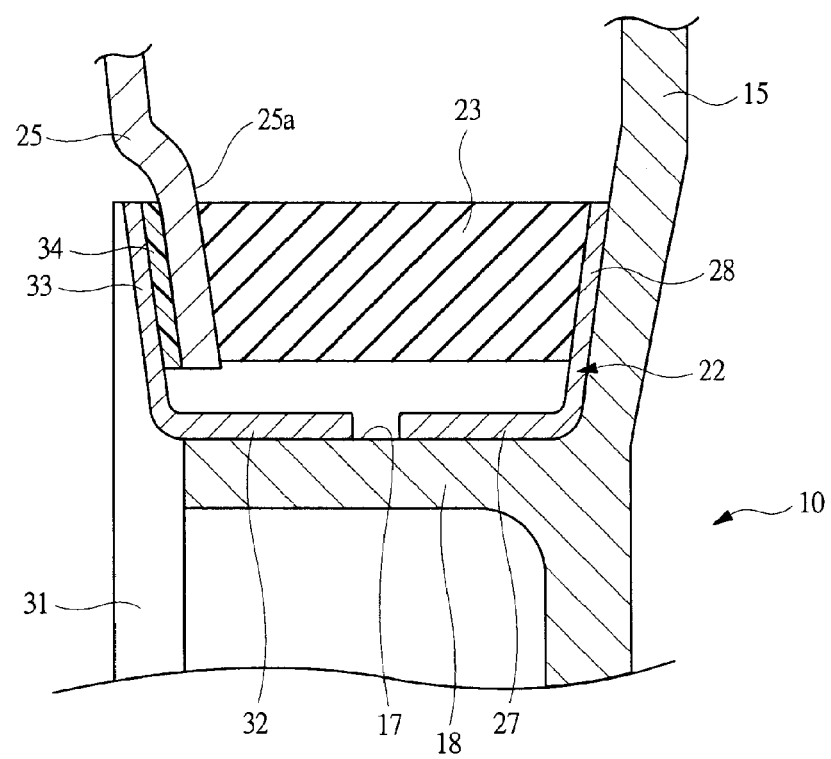
FIG. 4 is a sectional view showing a portion of an isolation damper pulley according to another embodiment.

FIG. 4 is a sectional view showing a portion of an isolation damper pulley according to another embodiment of the present invention. In the above embodiment, the fitting portion 32 of the pressure ring 31 and the fitting portion 27 of the isolation ring 27 are fitted to each other. In contrast, both of the fitting portions 27, 32 are axially fitted to the inside cylindrical portion 18 at different positions, in the case shown in FIG. 4. For manufacturing the isolation damper pulley as shown in FIG. 4, first, the fitting portion 27 is axially press-inserted into the inside cylindrical portion 18 until an outer surface of the supporting portion 28 abuts on the disk portion 15 of the hub 10, whereby the fitting portion 17 is directly fitted in the inside cylindrical portion 18. Next, the fitting portion 32 of the pressure ring 31 is axially press-inserted into the inside cylindrical portion 18, the predetermined pre-compression is applied to the annular elastic member 23 by the pressure ring 31 and the isolation ring 23, and concurrently the fitting portion 32 is directly fitted on the inside cylindrical portion 18 at a position where the axial-directional length between the end surface 14a of the damper section 1 and the pulley groove 26 becomes a predetermined length. Thus, after the isolation pulley section 2 is assembled to the damper section 1, the damper section 1 is assembled to the pressure ring 31. In assembling them, the axial-directional position of the pulley groove 26 with respect to the damper section 1 may be set while the pre-compression is applied to the annular elastic member 23.

When the fitting portion 32 of the pressure ring 31 is fitted outside the fitting portion of the isolation ring 22, the fitting portion 27 of the isolation pulley portion 32 is fitted to the inside cylindrical portion 18. Thereafter, the fitting portion 32 of the pressure ring 31 is fitted outside the fitting portion 27 of the isolation ring 22 and the axial-directional position of the pulley groove 26 with respect to the damper section 1 may be set while the pre-compression is applied to the annular elastic member 23.

INDUSTRIAL APPLICABILITY

The isolation damper pulley according to the present invention can be applied for transmitting rotational torque of the crankshaft of the engine to the various auxiliary machines via the endless belt.

The invention claimed is:

1. An isolation damper pulley attached to a crankshaft of an engine, comprising:
    a damper unit including a hub having a mounting hole for placement on said crankshaft, an inside cylindrical portion provided to said hub so as to be concentric with a center axis of said mounting hole, an annular mass body attached to an outside cylindrical portion provided to said hub via a first elastic member, and a disk portion provided so as to extend radially from said inside cylindrical portion to said outside cylindrical portion;
    a pulley portion including a cylindrical portion, in an outer circumferential portion of which a pulley groove is formed and which is disposed outside said annular mass body, and a cover portion extending from one axial-directional end of said cylindrical portion in a central direction;
    a second annular elastic member whose one axial-directional end is fixed to an inner face of a radial-inner portion of said cover portion, whose other axial-directional end is supported by said disk portion, and to which a pre-compression is applied axially; and
    a pressing unit having a cylindrical fitting portion that is concentric with said center axis and is positioned between an inner circumferential surface of said second annular elastic member and an outer circumferential surface of said inside cylindrical portion, and a pressing portion extending radially from said cylindrical fitting portion, said cover portion being axially pressed by said pressing portion, and said pressing unit applying an axial-directional pre-compression to said second annular elastic member,
    wherein said cylindrical fitting portion of said pressing unit is axially press-inserted into said inside cylindrical portion of said damper unit so as to be fitted coaxially, and a fixing position of said pressing unit is capable of being adjusted axially with respect to said inside cylindrical portion of said damper unit.

2. An isolation damper pulley attached to a crankshaft of an engine, comprising:
    a damper unit including a hub having a mounting hole for placement on said crankshaft, a cylindrical first fitting portion provided to said hub so as to be concentric with a center axis of said mounting hole, and an annular mass body attached to an outside cylindrical portion provided to said hub via a first elastic member;
    a pulley portion including a cylindrical portion, in outer circumferential portion of which a pulley groove is formed and which is disposed outside said annular mass body, and a cover portion extending from one axial-directional end of said cylindrical portion in a central direction;
    a second elastic member, whose one axial-directional end is supported by said cover portion and to which a pre-compression is applied axially;
    a supporting unit having a second fitting portion concentric with said center axis and supporting the other axial-directional end of said second elastic member; and
    a pressing unit having a third fitting portion concentric with said center axis, and a pressing portion extending radially from said third fitting portion, said pressing portion pressing axially said cover portion to apply axially the pre-compression to said second elastic member,
    wherein said second fitting portion and said third fitting portion are axially press-inserted into each other so as to be fitted coaxially, and an inner fitting portion of said second fitting portion and said third fitting portion is axially press-inserted into said first fitting portion so as to be fitted coaxially.

3. The isolation damper pulley according to claim 2, wherein said first fitting portion, said second fitting portion, and said third fitting portion are each formed in a cylindrical shape.

4. The isolation damper pulley according to claim 2, wherein an outer circumferential surface of said third fitting portion is fitted in an inner circumferential surface of said second fitting portion, and an inner circumferential surface of said third fitting portion is fitted in an outer circumferential surface of said first fitting portion.

5. An isolation damper pulley attached to a crankshaft of an engine, comprising:
    a damper unit including a hub having a mounting hole for placement on said crankshaft, a cylindrical first fitting portion provided to said hub so as to be concentric with a center axis of said mounting hole, and an annular mass body attached to an outside cylindrical portion provided to said hub via a first elastic member;
    a pulley portion including a cylindrical portion, in an outer circumferential portion of which a pulley groove is formed and which is disposed outside said annular mass body, and a cover portion extending from one axial-directional end of said cylindrical portion in a central direction;
    a supporting unit having a second fitting portion concentric with said center axis, and a supporting portion extending radially from said second fitting portion;
    a second annular elastic member, whose one axial-directional end is supported by said cover portion, whose other axial-directional end is supported by said supporting portion, and to which a pre-compression is applied axially between said cover portion and said supporting portion; and
    a pressing unit having a third fitting portion concentric with said center axis, and a pressing portion extending radially from said third fitting portion, said pressing portion pressing axially said cover portion to apply an axial-directional pre-compression to said second elastic member,
    wherein said second fitting portion and said third fitting portion are positioned between an inner circumferential surface of said second annular elastic member and an outer circumferential surface of said first fitting portion, and are press-inserted into said first fitting portion without being fitted to each other, thereby being fitted to said first fitting portion, and
    a fixing portion of said pressing unit is capable of being adjusted axially with respect to said first fitting portion of said damper unit.

6. A manufacturing method for an isolation damper pulley attached to a crankshaft of an engine, the method comprising the steps of:
    preparing a damper unit including a hub having a mounting hole for placement on said crankshaft, a cylindrical first fitting portion provided to said hub concentric with a center axis of said mounting hole, and an annular mass body attached to an outside cylindrical portion provided to said hub via a first elastic member;

preparing a pulley unit including a cylindrical portion, in an outer circumferential portion of which a pulley groove is formed and which is disposed outside said annular mass body, a cover portion extending from one axial-directional end of said cylindrical portion and supporting one axial-directional end of a second elastic member, and a supporting means provided with a second fitting portion concentric with said first fitting portion and supporting the other axial-directional end of said second elastic member;

press-inserting axially a third fitting portion of a pressing means into said second fitting portion, the pressing means having a pressing portion opposed to said cover portion and said third fitting portion concentric with said center axis, and fitting coaxially said second fitting portion and said third fitting portion under a state of applying axially a predetermined pre-compression to said second elastic member by said supporting means and said pressing means; and press-inserting axially an inner one of said second fitting portion and said third fitting portion into said first fitting portion and fitting coaxially said inner one to said first fitting portion at a position where an axial-directional isolation length between an end surface of said damper unit and said pulley groove becomes a predetermined length.

7. A manufacturing method for an isolation damper pulley attaching to a crankshaft of an engine, the method comprising the steps of:

preparing a damper unit including a hub having a mounting hole for placement on said crankshaft, a cylindrical first fitting portion provided to said hub so as to be concentric with a center axis of said mounting hole, and an annular mass body attached to an outside cylindrical portion provided to said hub via a first elastic member;

preparing a pulley unit including a cylindrical portion, in an outer circumferential portion of which a pulley groove is formed and which is disposed outside said annular mass body, a cover portion extending from one axial-directional end of said cylindrical portion in a central direction and supporting one axial-directional end of a second elastic member, a supporting means that is provided with a second fitting portion concentric with said first fitting portion and has a supporting portion extending radially from said second fitting portion, and a second annular elastic member whose one axial-directional end is supported by said cover portion and whose other axial-directional end is supported by said supporting portion;

press-inserting axially said second fitting portion into said first fitting portion and fitting coaxially said second fitting portion to said first fitting portion;

press-inserting axially a third fitting portion into said first fitting portion, a pressing means having a pressing portion opposed to said cover portion and the third fitting portion concentric with said center axis, said second and third fitting portions being positioned between an inner circumferential surface of said second annular elastic member and an outer circumferential surface of said first fitting portion; and applying axially a predetermined pre-compression to said second elastic member by said supporting means and said pressing means, and fitting coaxially said third fitting portion to said first fitting portion, without being fitted in said second fitting portion, at a position where an axial-directional isolation length between an end surface of said damper unit and said pulley groove becomes a predetermined length.

\* \* \* \* \*

UNITED STATES PATENT AND TRADEMARK OFFICE
CERTIFICATE OF CORRECTION

PATENT NO. : 8,038,554 B2
APPLICATION NO. : 10/564231
DATED : October 18, 2011
INVENTOR(S) : Hideaki Watanabe, Kazumi Oki and Yoshikazu Kakinuma Page 1 of 1

Figure 5:
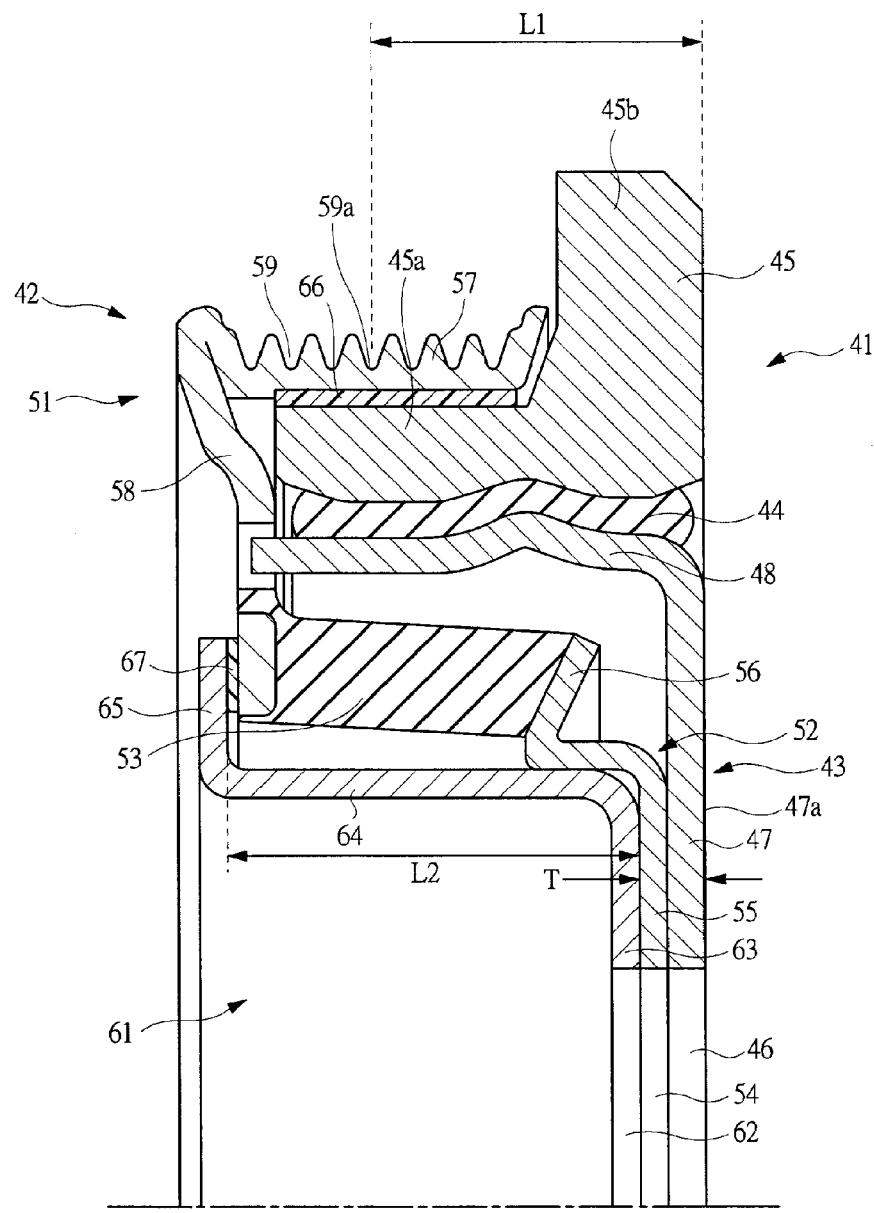
FIG. 5 is a sectional view showing a portion of an isolation damper pulley.

It is certified that error appears in the above-identified patent and that said Letters Patent is hereby corrected as shown below:

In the drawings, Sheet 5 of 5, please remove the legend "Prior Art" from Figure 5.

Signed and Sealed this
Fifth Day of March, 2013

Teresa Stanek Rea
*Acting Director of the United States Patent and Trademark Office*